Sept. 3, 1957  I. D. SIEGEL  2,805,312
ELECTRIC HEATING UNIT CONTROL
Filed Feb. 25, 1954  3 Sheets-Sheet 1
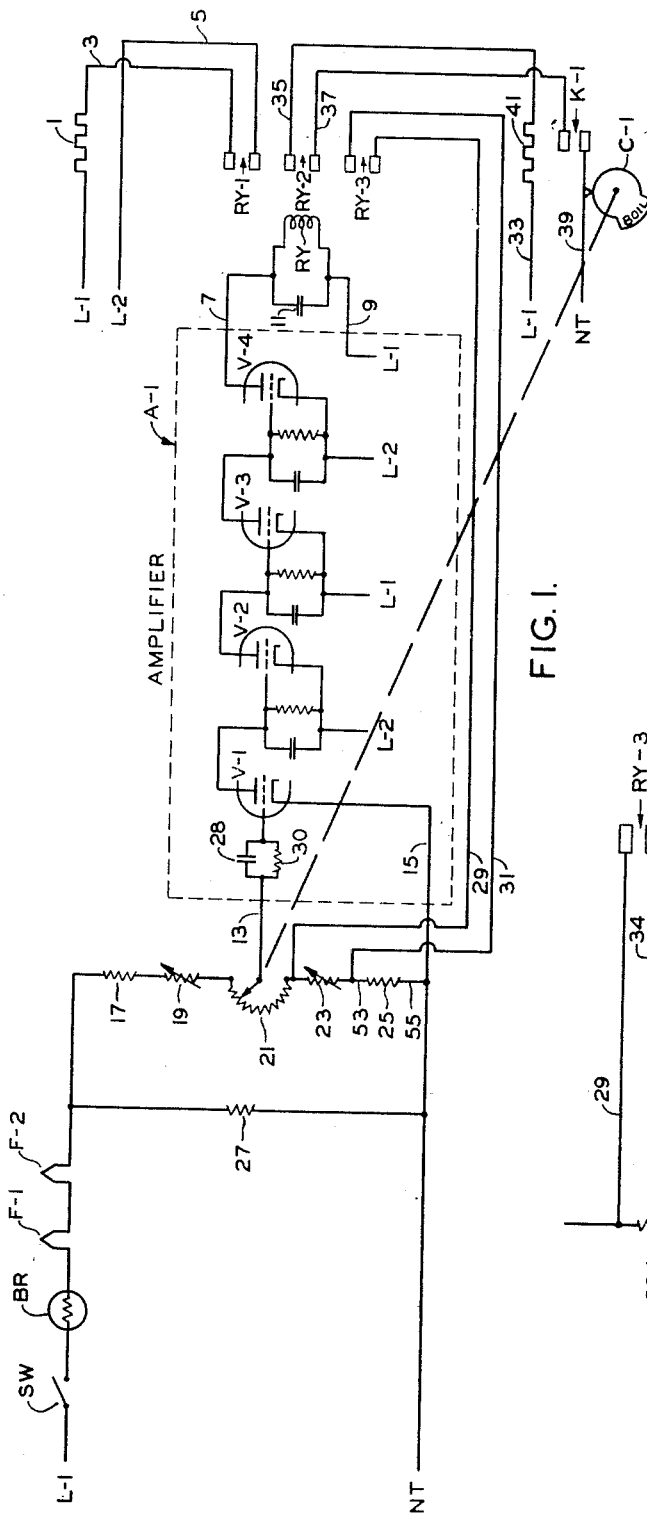
FIG. 1.
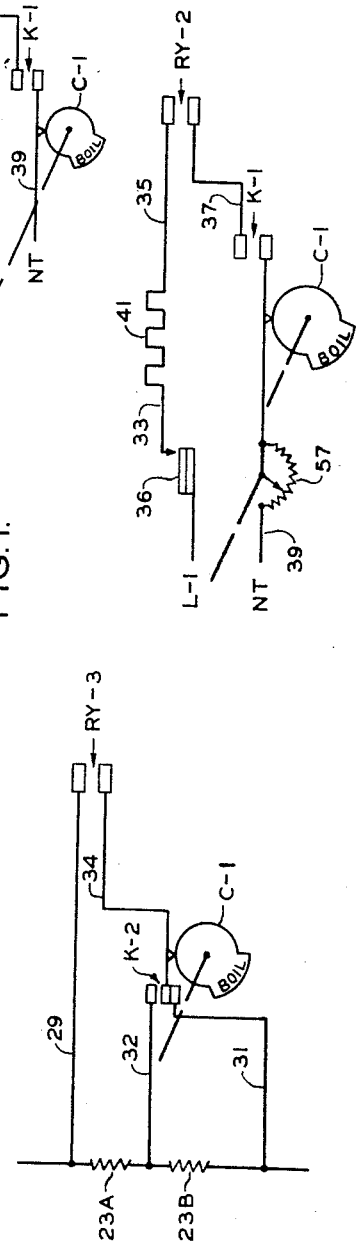
FIG. 5.
FIG. 4.
Irving D. Siegel,
Inventor.
Koenig and Pope,
Attorneys.

Sept. 3, 1957     I. D. SIEGEL     2,805,312
ELECTRIC HEATING UNIT CONTROL
Filed Feb. 25, 1954     3 Sheets-Sheet 2
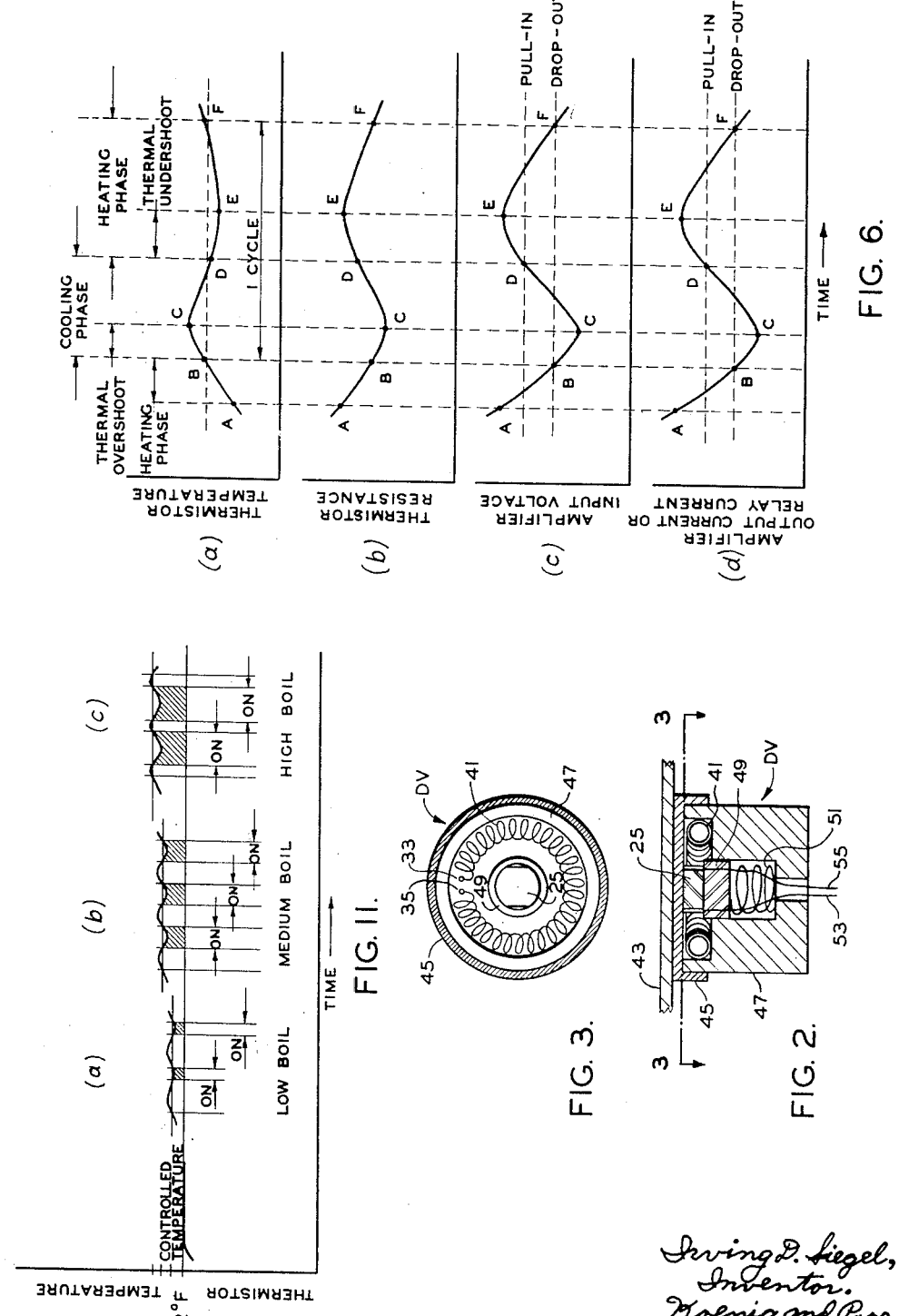
Irving D. Siegel,
Inventor.
Koenig and Pope,
Attorneys.

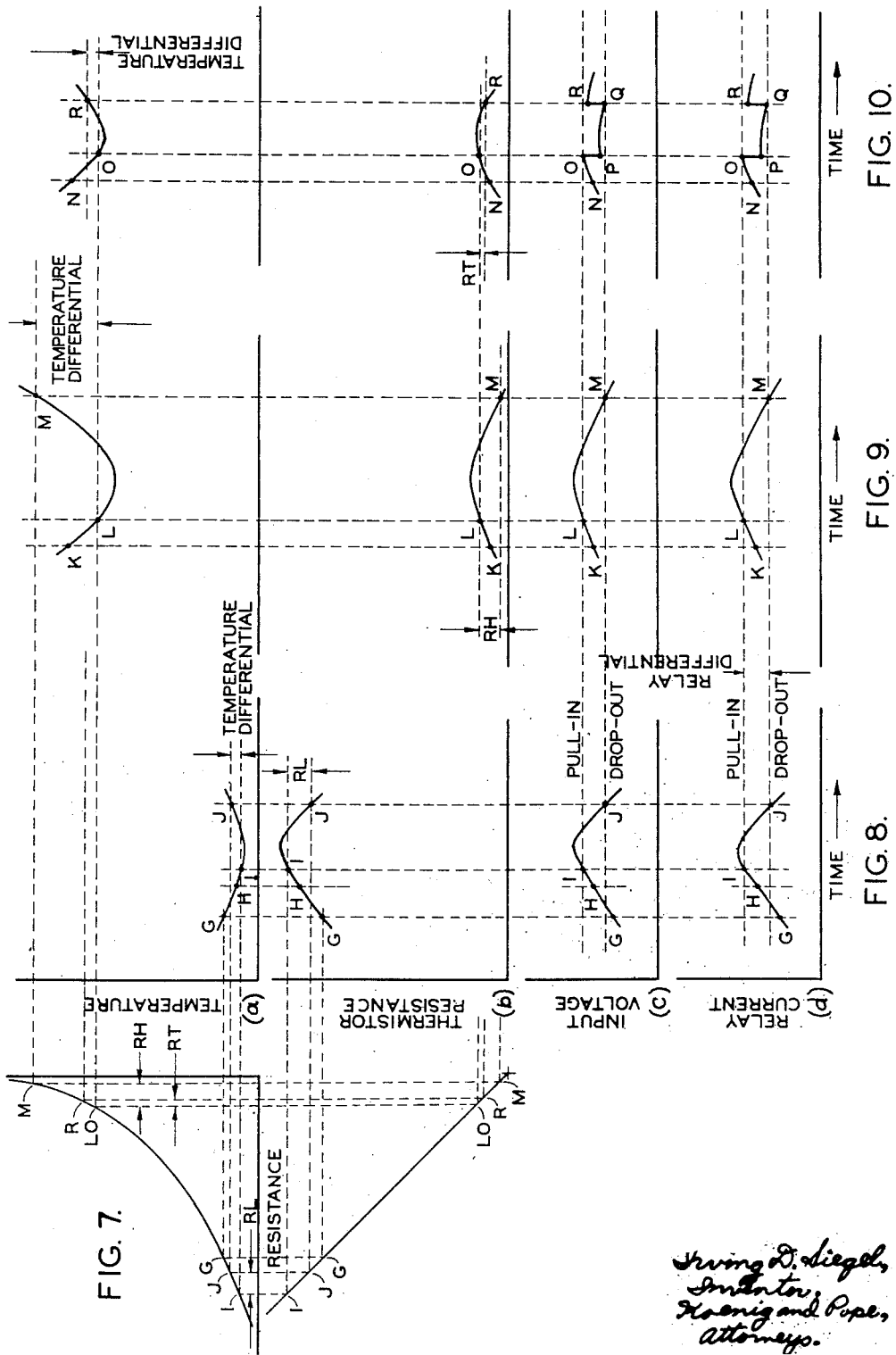

United States Patent Office 2,805,312
Patented Sept. 3, 1957

2,805,312

ELECTRIC HEATING UNIT CONTROL

Irving D. Siegel, University City, Mo., assignor to Magic Chef, Inc., St. Louis, Mo., a corporation of New Jersey Application February 25, 1954, Serial No. 412,445

21 Claims. (Cl. 219—20)

This invention relates to electric heating unit controls, and more particularly to control systems for electric heating units such as are used as top surface units in electric cooking ranges.

Among the several objects of the invention may be noted the provision of a system for controlling the heat input of an electric heating unit in response to the temperature of a thermal load; the provision of a control system for electric heating units which may be continuously adjusted to set and maintain the temperature of a thermal load to any predetermined value over a wide range thereof; the provision of a control system as described above which is highly sensitive to temperature changes of a thermal load to maintain its temperature within close limits to any predetermined temperature selected from over a wide range thereof; the provision of such a control system which provides for maximum heating rates and is relatively insensitive to power-line voltage variations; the provision of a system for isothermally (such as at a boiling temperature) controlling the heat input supplied to a thermal load to any of a plurality of selected predetermined values; the provision of a control system of the type described which may be compensated for by altitude-induced changes in the boiling temperature of said thermal load; and the provision of such a control system which is economical, dependable and has a minimum of mechanical parts. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a circuit diagram of a control system of the present invention;

Fig. 2 is a vertical section of a thermistor and heater element component employed in the control system of Fig. 1;

Fig. 3 is a horizontal section taken on line 3—3 of Fig. 2;

Fig. 4 is a diagram of a circuit modification which may be employed in the exemplary control system of Fig. 1;

Fig. 5 is a diagram of another circuit embodiment which may be used in the Fig. 1 control system;

Figs. 6–10 are charts graphically representing the interrelationship of various parameters utilized in the operation of the control system of the present invention; and Fig. 11 is a chart graphically representing various time-temperature relationships involved in the operation of said control system.

Corresponding reference characters indicate corresponding parts throughout the several views of the drawings.

Referring now to the drawings and more particularly to Fig. 1, an electric heating unit, such as may be employed as a surface unit in electric cooking ranges, is indicated at reference numeral 1. Electric supply lines L–1 and L–2 which, for example, supply 230 v. A. C., 60 C. P. S. power are connected to heating unit 1 via wires 3 and 5 and a set of contacts RY–1. A relay coil RY connected to a pair of output terminals 7 and 9 of an amplifier unit A–1 controls the actuation of relay contacts RY–1 and two additional sets of relay contacts RY–2 and RY–3. A condenser 11 bypasses relay coil RY to inhibit contact chatter.

Connected across a pair of input terminals 13 and 15 of amplifier A–1 is an electrical network or circuit including a voltage-dropping resistor 17, an altitude-compensating rheostat or adjustable resistor 19, a temperature-adjusting potentiometer or adjustable resistor 21, a temperature-differential rheostat or adjustable resistor 23, and a temperature-sensitive resistor or thermistor 25. Resistors 17, 19, 21, 23 and 25 are connected in series with a switch SW, a ballast regulator BR, filaments F–1 and F–2 (of four amplifier vacuum tube sections V–1—V–4) and across electric supply lines L–1 and NT which serve to supply a potential of preferably 115 v. A. C., 60 C. P. S. power. A low-resistance, high-power dissipating stabilizing resistor 27 is shunt-connected across the input circuit resistors 17—25. Two wires, 29 and 31, interconnect relay contacts RY–3 and the temperature-differential resistor 23. Another set of wires 33, 35, 37 and 39 interconnect a heater element 41, contacts RY–2 and a set of contacts K–1 across A. C. supply lines L–1 and NT. Contacts K–1 are responsive to movement of a cam C–1 which is mechanically linked to temperature-adjusting potentiometer 21 as indicated by the dashed line. The degrees of rotation of cam C–1 and potentiometer 21 are preferably calibrated in ° F. (e. g., 150° F. to 450° F.) or by words which indicate comparative temperature ranges. At certain low temperature settings of cam C–1 and potentiometer 21, such as within a range indicated by "Boil," contacts K–1 are closed. The resistance of potentiometer 21 is preferably a nonlinear function of its adjustment. For example, the rate of resistance change as the resistor 21 is adjusted over the boil range would be substantially less than at lower or higher temperatures.

Amplifier unit A–1 serves to amplify electrical signals fed to input terminals 13 and 15 to levels sufficiently high to energize relay coil RY and thereby actuate contacts RY–1, RY–2 and RY–3. Amplifier A–1 may be of any of the usual designs, as long as the output or relay current is substantially directly proportional to the input signal voltage. The particular amplifier circuit illustrated includes, for example, two duo-triode vacuum tubes, the separate triode sections V–1—V–4 of which are separately referenced. The V–1 and V–2 sections, enclosed in a common envelope, are connected in cascade, the cathodes of which are heated by filament F–1. Triode sections V–3 and V–4, heated by filament F–2, are also cascade-connected within a single envelope and serve to further amplify the input signal. The grid circuit of section V–1 includes a grid-leak biasing section made up of a shunt-connected condenser 28 and a resistor 30, the resistors 23 and 25, as well as the portion of the resistance in potentiometer 21 connected between line NT and the rotor of potentiometer 21. Although an A. C. power source such as is indicated at L–2 and L–1 is used to power amplifier A–1, amplifiers using a D. C. potential source also may be employed conveniently.

Figs. 2 and 3 illustrate in detail an exemplary temperature-sensitive device DV which is adapted to be positioned in heat exchange relationship or thermal communication (preferably biased so as to be in contact) with a thermal load, such as a cooking pot or the like, a portion of the bottom of which is indicated at numeral 43. Unit DV is usually mounted centrally with regard to a top surface unit of a cooking range, with a thin conductive metal sheath or cap 45 mechanically biased against the bottom of pot 43. Thermistor 25, which is supported inside a ceramic insulating block 47 by means of an insulating disk 49, is biased against the undersurface of cap 45 by a spring 51. Heating element 41 in the form of a metallic coil is placed in close thermal communication with thermistor 25, such as by coiling it therearound. Leads 53 and 55 are brought out the bottom of the block 47 and interconnect thermistor 25 with temperature-differential resistor 23 and the power line NT. Leads 33 and 35 for heater element 41 (not specifically shown in Fig. 2) are connected in the control system as shown in Fig. 1.

Operation is as follows:

Upon closing switch SW, an electrical circuit is completed through the input circuit for amplifier A–1. The current through filaments F–1 and F–2 and this circuit or network is regulated by means of ballast regulator BR and voltage stabilized (by the shunting action of resistor 27 across resistors 17—25), thus insuring stable emission characteristics for vacuum tube sections V–1—V–4. Referring now to Figs. 1 and 6, point A (Fig. 6a) represents an initial temperature of thermistor 25. This temperature is substantially equal to that of the thermal load (or it differs from it by a substantially constant value) as it is separated therefrom only by the highly conductive metal cap 45 and cooking pot bottom 43. The temperature indicated by the dashed horizontal line of Fig. 6a represents approximately the initially selected predetermined temperature at which it is desired to maintain the thermal load and to which the rotor of temperature-adjusting potentiometer 21 is set. As the resistance of the conventional thermistor is inversely proportional to its temperature, the resistance of thermistor 25 in this instance will have a value initially represented by point A of Fig. 6b (which corresponds to thermistor temperature A of Fig. 6a). The input voltage to amplifier A–1 at thermistor temperature A is indicated at point A in Fig. 6c and represents the level of an electrical A. C. signal produced by the composite voltage drop across thermistor 25, temperature-differential resistor 23 and the temperature-adjusting potentiometer 21 between its rotor arm and wire NT. This voltage drop is applied to input terminals 13 and 15 and the resulting output or relay current is represented by point A of Fig. 6d. Thus it can be seen that the input signal level is a function of the resistance (and therefore the temperature) of thermistor 25 and the adjustment of the arm of potentiometer 21. This latter adjustment selects the temperature at which the thermal load will be substantially maintained by determining the resistance the thermistor must attain to produce an input signal voltage of a predetermined amplitude level sufficient to actuate or pull-in relay RY.

As the amplifier output current at time A is above the level required to actuate relay RY, contacts RY–1 close to energize heating unit 1 so that heat will be supplied to the thermal load. For the purpose of explaining the operation of Figs. 6–9, it will be assumed that contacts RY–2 and RY–3 are not closed by relay RY. The details of the effect of the actuation by these sets of contacts RY–2 and RY–3 will be discussed in detail hereinafter.

The energization of the heating unit 1 causes a change in the system parameters represented on the ordinates of Figs. 6a–6d along the respective curves until point B is reached. In Fig. 6a, point B represents the temperature corresponding to the amplifier output current level at which the contacts of relay RY will drop out. The difference between the pull-in and drop-out levels in Fig. 6d is known as the relay differential. The amount of this differential is dependent on the design and construction of the individual relay and will differ in different relays.

The opening of relay contacts RY–1 deenergizes the heating unit 1 and initiates a cooling phase at point B. However, as indicated by the Fig. 6 curves, from points B to C, a thermal overshoot period follows heating phase AB. The decreasing temperature of thermistor 25 increases its resistance to a point D which increases the input signal to amplifier A–1 to an amplitude sufficient to increase the output current thereof above a pull-in level. A second heating phase then commences at point D, initiated by the thermal undershoot period DE, during which the tendency of the thermal load to continue cooling is gradually overcome by the heat input from unit 1. In the final portion of the heating phase EF, the thermistor temperature increases until the amplifier output again falls below a drop-out value. Thus, it can be seen that the control system of Fig. 1 maintains a temperature of a thermal load substantially constant at any preselected predetermined temperature at which the arm of the temperature-adjusting potentiometer 21 is set, by fully energizing and deenergizing heating unit 1 intermittently. If a low temperature is present, unit 1 still is energized fully each time the thermistor temperature dictates a heat demand, but the durations of the heating-unit energization are merely shorter and less frequent at these lower temperatures than at higher ones.

The foregoing explanation of the operation of an exemplary control system of the present invention illustrates that there is a differential in the output current levels needed to actuate and deactuate relay RY. This current or relay differential is reflected back into the system as a differential in thermal load temperatures necessary to energize and deenergize relay RY. This difference in thermistor or thermal load temperatures necessary to energize and deenergize respectively relay RY is designated as the temperature differential. If the relation of the thermistor temperature to thermistor resistance were linear throughout the temperature range controlled by potentiometer 21, then this temperature differential would not vary between high and low temperature operation. However, as illustrated by the curve of Fig. 7, the rate of resistance change of thermistor 25 per degree temperature change is much greater at low temperatures than at high temperatures. In other words, a much larger temperature differential is necessary at higher temperatures to change the amplifier output level between the predetermined relay pull-in and drop-out conditions.

The variability of the temperature differential at various temperatures is most undesirable and makes it extremely difficult at higher temperatures to control the thermal load closely between narrow temperature limits. The effect of this temperature differential is illustrated in Figs. 8–10. In Fig. 8, the relationship of the various system parameters to time at a relatively low temperature setting (e. g., 150° F.) of potentiometer 21 is illustrated. The cooling phase is indicated by the curves GHI and the thermal undershoot and heating phase is represented by curves IJ. The thermistor resistance change between pull-in and drop-out levels is indicated by RL which is extrapolated through the thermistor characteristic curve of Fig. 7 to Fig. 8a to show the temperature differential at this relatively low temperature.

The curves KLM of Fig. 9 represent a cooling-heating cycle when the arm of potentiometer 21 is set to a higher temperature (e. g., 400° F.). The thermistor resistance change (RH) necessary at this temperature to alter the amplifier output between pull-in and drop-out levels is extrapolated through Fig. 7. The increased temperature differential at high temperatures is shown in Fig. 9a as compared to the smaller temperature differential at low temperatures shown in Fig. 8a.

Referring again to Fig. 1, it will be noted that contacts RY–3 are adapted to short out temperature-differential resistor 23 whenever relay RY is energized. The advantageous effects resulting from this circuit may be noted in Fig. 10, wherein curves NOR illustrate a cooling-heating cycle at approximately the same high temperature (e. g., 400° F.) as in Fig. 9. When the thermistor temperature drops to a value indicated at point O, relay RY reaches its pull-in level and is actuated. However, not only is heating unit 1 energized to heat the thermal load (by the closing of contacts RY–1), but the temperature-differential resistor 23 is shorted out simultaneously by the closing of contacts RY–3. The elimination of the resistance of resistor 23 from the input circuit of amplifier A–1 immediately drops the input voltage and relay current to point P, as indicated in Fig. 10c and Fig. 10d. This modified or altered input voltage and the corresponding relay current values are much nearer the drop-out value so that the amount of temperature increase (corresponding to resistance difference RT) needed to decrease the output current below the drop-out point is much less than if resistor 23 were not shorted out. This is aptly demonstrated by the differences in the respective temperature differentials of Fig. 9a and Fig. 10a.

When the temperature has increased to point R, then the drop-out voltage is reached (point Q of Fig. 10c and Fig. 10d) and relay RY is deenergized, permitting contacts RY–1 and RY–3 to open. This action simultaneously reconnects resistor 23 into the input circuit of amplifier A–1 and deenergizes heating unit 1. The portion of the Fig. 10c and Fig. 10d curves indexed QR represents this instantaneous effect in reconnecting resistor 23. Resistor 23 is preferably adjustable so that the temperature differential may be varied with any individual relay and so that in each instance it can be adjusted to vary the input signal an amount somewhat less than the corresponding difference between the first and second predetermined relay currents necessary to cause pull-in and drop-out, respectively.

Another important feature of the present invention is the supplying of varying amounts of heat isothermally to the thermal load at boiling temperatures. This is demonstrated by Fig. 11. As noted previously, the control system of Fig. 1 maintains the temperature of a thermal load relatively constant at any one of a wide range of continuously selectable temperatures. However, if the control arm of potentiometer 21 is adjusted to a setting corresponding to a temperature greater than the boiling temperature of the particular thermal load, it can be seen that the temperature of the thermal load (and thus the corresponding temperature of thermistor 25) cannot increase above the boiling point. This is shown graphically on the left of Fig. 11 wherein the curve representing thermistor temperature versus time further illustrates that the temperature rises to a controlled temperature (representing the boiling point of the thermal load) and thereafter remains constant. Under such conditions relay RY would continue to maintain heating unit 1 in an energized condition. In accordance with the present invention, heater element 41 (Figs. 1–3) is mounted in thermal communication with thermistor 25 and connected in the control system so that, when potentiometer 21 and cam C–1 are manually adjusted to a temperature setting within the "Boil" range (e. g., 212–230° F.), contacts K–1 are closed. When relay contacts RY–2 are closed (simultaneously with the closure of contacts RY–1 and RY–3), an electric circuit is completed from power lines L–1 and NT through closed contacts K–1 and heater element 41. The temperature of thermistor 25 under this condition is not solely dependent on that of the thermal load, but rather is a composite function of both it and the heat supplied by element 41. Thus, if the thermal load is water, and if the arm of potentiometer 21 is set to a temperature above the boiling point (e. g., 214° F.), the thermal load will be maintained at a 212° F. temperature level (or the boiling temperature at the prevailing atmospheric conditions and altitude), but the heating unit 1 will be energized intermittently, as illustrated in Fig. 11a, to give a low heat input and effect low boil conditions. The thermistor temperature is increased to 214° F. by action of heater element 41 which thereby causes drop-out of relay RY. When the thermistor has cooled to a lower temperature (determined by the temperature differential set by resistor 23), heating unit 1 and heater element 41 are reenergized simultaneously. The duration of time that heating unit 1 is energized is a function of the temperature setting of potentiometer 21. As this temperature setting is increased, for example to 216° F. and 218° F., the periods of energization of heating unit 1 become longer as it takes more time for heater element 41 to heat thermistor 25 to these higher temperatures, respectively. Fig. 11b and Fig. 11c show the increased heating periods at medium and high boil settings. Thus, the heat input during all boiling operations (which take place isothermally, i. e., at substantially constant temperatures) can be controlled to supply any desired degree of heat, as for example from just enough heat for boiling an egg to a sufficient amount of heat to cause vigorous rolling circulation and agitation of the boiling thermal load.

Fig. 4 is a circuit diagram of one modification of the Fig. 1 control system wherein resistor 23 is replaced by two series-connected resistors 23A and 23B. In this embodiment contacts RY–3 modify the resistance of the input current of amplifier A–1 by shorting resistors 23A and 23B, rather than single resistor 23. Resistor 23A may be adjustable, if desired, for the same reasons as described above in regard to resistor 23. Cam C–1 (adapted to be mechanically linked as indicated by the dashed line to the arm of potentiometer 21) is provided to move an auxiliary contact K–2 into electrical connection with a wire 32 when the control system is set to supply heat to the thermal load at a temperature within the boiling range. Wire 34 interconnects contact K–2 to contacts RY–3. Thus, the combined resistance of resistors 23A and 23B serve the same purpose as the resistance of resistor 23 and the control system including this modification operates the same as described above while the settings of temperature-adjusting potentiometer 21 and cam C–1 are outside of the boiling range. However, during operation at any boiling-range setting only the resistance of resistor 23A is cut in and out of the input circuit with actuation of contacts RY–3. In this way the compensation for temperature differential effects (due to relay differential as explained above) is decreased at "Boil" settings to avoid the possibility of relay chatter, etc. If desired, cam C–1 could be cut to maintain contacts K–2 closed at all low-temperature settings, such as any below 230° F.

Fig. 5 illustrates another modification of the control system of Fig. 1 wherein the current flow through heater element 41 can be adjusted by a rheostat 57 to vary its thermal output. This adjustment of variable resistor 57, either separately or in conjunction with temperature-adjusting potentiometer 21, may be used to select the desired amount of heat input to the thermal load at boiling temperature. That is, instead of setting potentiometer 21 to various temperatures a little above the boiling point of the thermal load, resistor 57 would be independently adjusted so that heater element 41 is energized at lower or higher current levels, thus increasing or decreasing the periods that heating unit 1 is energized. However, as it is preferable to have only a single manual control, adjustable resistor 57 is mechanically linked to potentiometer 21 (as shown by the dashed line in Fig. 5) to operate in conjunction with it and cam C–1. Thus, as temperature-adjusting potentiometer 21 is adjusted within the boiling range, the corresponding dependent movement of adjustable resistor 57 controls the heat supplied isothermally to the load by varying the thermistor temperature (through its mdification of the heat output of heater element 41).

It will be understood that the resistance of resistor 57 may also be a nonlinear function of its adjustment. For example, resistor 57 may have a resistance-adjustment characteristic which is substantially constant (at a high resistance value) except as it is adjusted through the boiling range, during which time its resistance increases as it is adjusted toward higher heat-input settings.

Thus, the heat input to a thermal load may be controlled isothermally by adjustment of potentiometer 21 or adjustable resistor 57, either independently of each other or jointly by linking them together, and in either instance the resistance-adjustment characteristics of either or both of these resistors may be nonlinear.

A bimetallic thermo-cutout switch connected in series with wire 33 of Fig. 5 is indicated by reference numeral 36. This unit is placed in thermal communication with thermistor 25 or the thermal load and is constructed so that it closes at a temperature a little below that representing the boiling point of the thermal load, and remains closed at any higher temperatures. The inclusion of this switch 36 is optional, but may be desirable in any instance where the characteristics of the components are such that when the thermal load is cold and potentiometer 21 is initially set to a temperature within the boiling range, heater 41 heats thermistor 25 to a temperature representing the relay drop-out value before the thermal load is actually raised to that temperature. With such conditions obtaining, unit 36 would avoid the possibility of momentarily deenergizing and then reenergizing heating unit 1 during the period thermal load temperature is raised toward boiling. However, the refinement supplied by use of unit 36 is not usually needed.

It is to be noted that the altitude-compensating rheostat 19 may have a scale calibrated in number of feet above sea level, so that the input network can be adjusted conveniently by the user to the actual elevation.

It will be understood that the arrangement of resistors 17, 19, 21, 23 and 25 in the input network may be modified. For example, resistor 23 may be connected between resistors 19 and 21 in which case contacts RY-3 would be normally closed and would be opened upon energization of relay RY.

Also, it will be understood that temperature-sensing devices other than that shown at DV may be employed.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A control system for an electric heating unit which is adapted to heat a thermal load, comprising a thermistor mounted in thermal communication with said thermal load, an electrical circuit including said thermistor series-connected with a first resistor and a second resistor, said circuit being adapted to produce an electrical signal the level of which is a function of the composite resistance of said thermistor and resistors, said first resistor being adjustable to vary the signal level produced at any specific thermistor temperature, means responsive to a first predetermined level of said signal to energize said heating unit and responsive to a second predetermined level of said signal to deenergize said heating unit, and means actuable only at higher thermistor temperatures for altering simultaneously with energization of said unit the signal level by an amount less than the difference between said first and second predetermined levels whereby only at higher thermistor temperatures the temperature differential necessary to effect energization and deenergization of said unit is decreased.

2. A control system for an electric heating unit which is adapted to heat a thermal load, comprising a thermistor mounted in thermal communication with said thermal load, an electrical circuit including said thermistor series-connected with first and second resistors adapted to produce an electrical signal the level of which is a function of the composite resistance of said thermistor and said resistors, means responsive to a first predetermined level of said signal to energize said heating unit and responsive to a second predetermined level of said signal to deenergize said heating unit, said first resistor being adjustable to vary the signal level produced at any specific thermistor temperature whereby said first and second predetermined signal levels can be produced at any desired temperature value, and means for shunting said second resistor simultaneously with energization of said unit to alter simultaneously the value of said composite resistance and thus modify the signal level by an amount less than the difference between said first and second predetermined levels whereby the temperature differential necessary to effect energization and deenergization of said unit is decreased.

3. A control system as described in claim 2 wherein said second resistor is also adjustable to vary the amount of temperature differential decrease.

4. A control system as described in claim 2 wherein said electrical circuit further includes a third resistor adjustable to compensate for altitude-induced changes in the boiling temperatures of said thermal load.

5. A control system as described in claim 2 which further includes means responsive to adjustment of said first resistor to permit shunting said second resistor only at higher thermistor temperatures.

6. A control system for an electric heating unit which is adapted to heat a thermal load, comprising a thermistor mounted in thermal communication with said thermal load, a heater element in thermal communication with said thermistor and adapted when energized to heat said thermistor, an electrical circuit including said thermistor series-connected with a resistor adapted to produce an electrical signal the level of which is a function of the composite resistance of said thermistor and resistor, said resistor being adjustable to vary the signal level produced at any specific thermistor temperature, and means responsive to a first predetermined signal level to energize said heating unit and responsive to a second predetermined signal level to deenergize said heating unit, said means responsive to signal levels representing temperatures approximating the boiling temperature of said thermal load to simultaneously energize and deenergize said heater element with said heating unit whereby varying amounts of heat are supplied isothermally to said load at the boiling temperature thereof.

7. A control system as described in claim 6 wherein said resistor is calibrated in units indicating the range of temperatures at which said thermal load may be selectively maintained and the resistance of said resistor is a nonlinear function of its adjustment.

8. A control system as described in claim 7 which further includes a second variable resistor connected with said heater element to adjust the thermal output thereof.

9. A control system as described in claim 8 in which said variable resistors are mechanically linked together.

10. A control system for an electric heating unit which is adapted to heat a thermal load, comprising a thermistor mounted in thermal communication with said thermal load, a heater element in thermal communication with said thermistor and adapted when energized to heat said thermistor, an electrical circuit including said thermistor series-connected with first and second resistors adapted to produce an electrical signal the level of which is a function of the composite resistance of said thermistor and resistors, said first resistor being adjustable to vary the signal level produced at any specific thermistor temperature, said first resistor being calibrated in units indicating the range of temperatures at which said thermal load may be selectively maintained, means responsive to a first predetermined signal level to energize said heating unit and responsive to a second predetermined signal level to deenergize said heating unit, means to alter simultaneously with energization of said unit the value of said composite resistance and thus modify the signal level by an amount less than the difference between said first and second predetermined levels whereby the temperature differential necessary to effect energization and deenergization of said unit is decreased, and means responsive to signal levels representing temperatures approximating the boiling temperature of said thermal load to simultaneously energize and deenergize said heater element with said heating unit whereby varying amounts of heat are supplied isothermally to said load at the boiling temperature thereof.

11. A control system as described in claim 10 which further includes a second variable resistor connected with said heater element to adjust the thermal output thereof and which is calibrated in units representing the amount of heat input to said thermal load.

12. A control system as described in claim 10 which further includes a second variable resistor connected with said heater element to adjust the thermal output thereof, said two variable resistors being mechanically linked together, the resistance of the first said variable resistor being a nonlinear function of its adjustment.

13. A control system as described in claim 10 wherein said means for altering said composite resistance is actuable only at higher thermistor temperatures.

14. A control system as described in claim 12 wherein the resistance of the said second variable resistor is also a nonlinear function of its adjustment.

15. A control system for an electric heating unit which is adapted to heat a thermal load, comprising a thermistor mounted in thermal communication with said thermal load, a heater element in thermal communication with said thermistor and adapted when energized to heat said thermistor, an amplifier, an input circuit for said amplifier including said thermistor series-connected with two resistors adapted to produce an electrical signal the level of which is a function of the composite resistance of said thermistor and resistors, the resistance of said first resistor being adjustable to vary the signal level produced at any specific thermistor temperature, said first resistor being calibrated in units indicating the range of temperatures at which said thermal load may be selectively maintained, an output circuit for said amplifier including a relay having several sets of contacts, the first set of contacts being adapted to energize said heating unit, the second set of contacts being adapted to modify the effective resistance of said second resistor, and the third set of contacts being adapted to energize said heater element, said relay being responsive to a first predetermined signal level to actuate said sets of contacts and to a second predetermined signal level to deactuate said sets of contacts whereby the temperature differential necessary to effect energization and deenergization of said heating unit is decreased and varying amounts of heat are supplied isothermally to said load at the boiling temperature thereof.

16. A control system as described in claim 15 wherein the resistance of said second resistor is adjustable to vary the amount of temperature differential decrease.

17. A control system as described in claim 15 which further includes switching means responsive to adjustment of said first resistor outside of a range approximating the boiling temperature of said thermal load to maintain said heater element deenergized.

18. A control system as described in claim 15 wherein the resistance of said first resistor is a nonlinear function of its adjustment.

19. A control system as described in claim 15 which further includes a third resistor connected with said heater element to adjust the thermal output thereof.

20. A control system as described in claim 15 which further includes additional switching means responsive to adjustment of said first resistor to settings representing lower temperatures of said thermal load to maintain unmodified the effective resistance of said second resistor.

21. A control system as described in claim 19 wherein said first and third variable resistors are mechanically linked together.

References Cited in the file of this patent

UNITED STATES PATENTS

| | | |
|---|---|---|
| 2,218,502 | Breitenstein | Oct. 22, 1940 |
| 2,220,028 | Smith | Oct. 29, 1940 |
| 2,376,488 | Jones | May 22, 1945 |
| 2,409,414 | Bletz | Oct. 15, 1946 |
| 2,490,965 | Huck | Dec. 13, 1949 |
| 2,496,860 | Davis | Feb. 7, 1950 |
| 2,500,061 | Clark | Mar. 7, 1950 |
| 2,600,313 | Mershon | June 10, 1952 |
| 2,610,797 | Miller | Sept. 16, 1952 |

OTHER REFERENCES

Wilson: Electronic Control of Home Heating, Electronics, vol. 23, No. 12, December 1950, pages 84–87.